Figure 1:
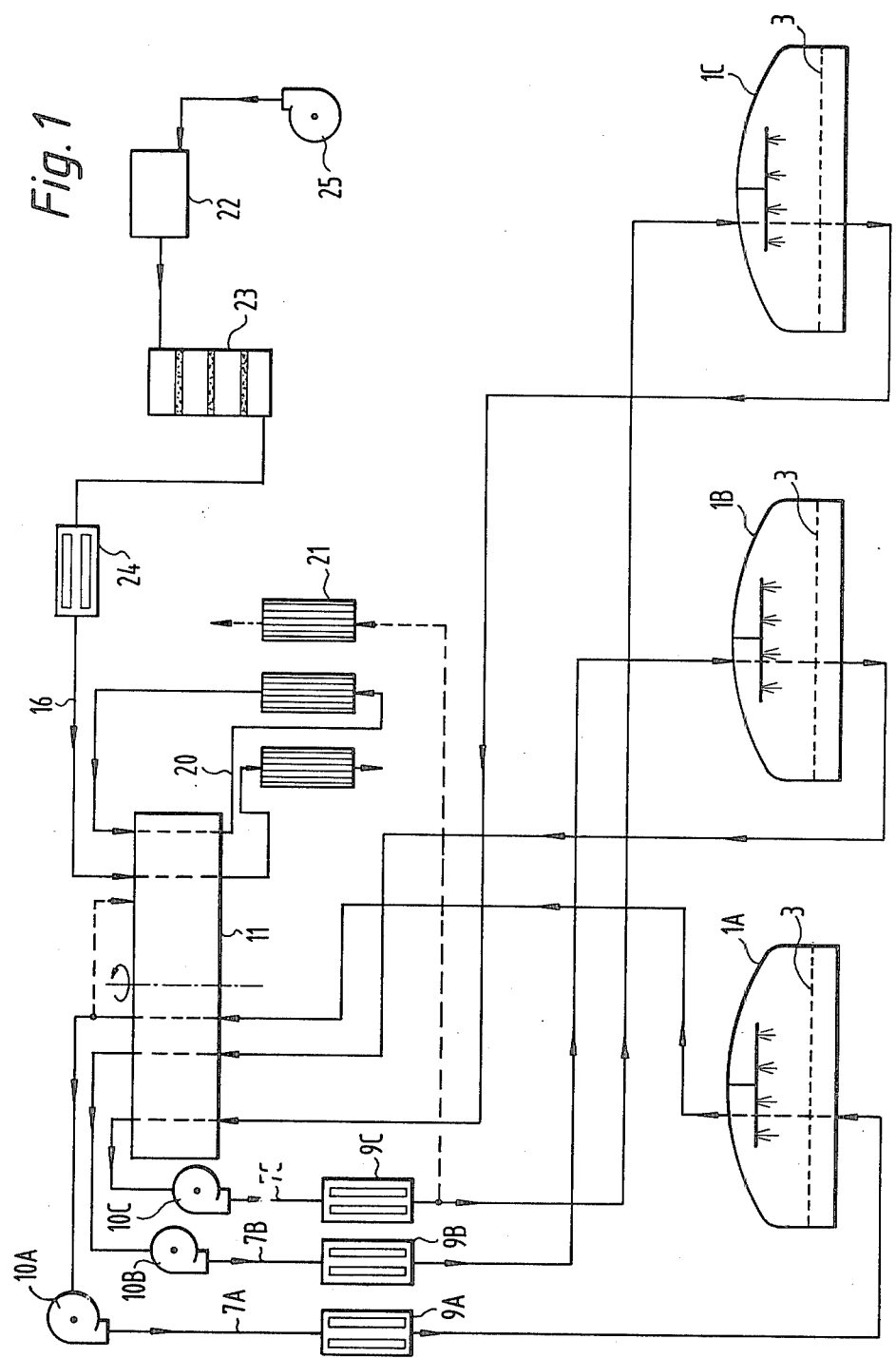

United States Patent [19]

Hussmann

[11] Patent Number: 4,475,295
[45] Date of Patent: Oct. 9, 1984

[54] INSTALLATION FOR THE DEHUMIDIFICATION OF A GASEOUS DRYING MEDIUM USING AN ADSORBENT AND WITH REGENERATION OF THE ADSORBENT

[75] Inventor: Peter Hussmann, Florence, Italy

[73] Assignee: Mittex Aktiengesellschaft, Vaduz, Liechtenstein

[21] Appl. No.: 373,486

[22] PCT Filed: Aug. 20, 1981

[86] PCT No.: PCT/EP81/00129
§ 371 Date: Apr. 19, 1982
§ 102(e) Date: Apr. 19, 1982

[87] PCT Pub. No.: WO82/00596
PCT Pub. Date: Mar. 4, 1982

[30] Foreign Application Priority Data

Aug. 20, 1980 [DE] Fed. Rep. of Germany ....... 3031446

[51] Int. Cl.³ .............................................. F26B 21/08
[52] U.S. Cl. ........................................... 34/80; 34/54; 34/47; 34/213; 55/390
[58] Field of Search ........................ 34/80, 81, 54, 210, 34/212, 213, 216, 217, 187, 47; 55/390

[56] References Cited

U.S. PATENT DOCUMENTS 3,487,608  1/1970  Graff ....................................... 55/390
3,621,585  11/1971 Robertson ............................... 34/10
4,255,171  3/1981  Dravnieks .............................. 55/390

FOREIGN PATENT DOCUMENTS 1729438  4/1967  Fed. Rep. of Germany .
1963876  12/1969 Fed. Rep. of Germany .
1162101  9/1966  United Kingdom .

Primary Examiner—Larry L. Schwartz
Attorney, Agent, or Firm—Schwartz, Jeffery, Schwaab, Mack, Blumenthal & Koch

[57] ABSTRACT

In an installation of this type, several chambers divided into groups A, B, C, D, are provided, the several groups of chambers B, C, D are traversed drying medium, while another group of chambers A is e traversed by a gaseous medium for the regeneration of the adsorbent present in this group of chambers. The partial streams of the drying medium have different moisture contents and are used in different phases of a drying process. Continuous switching takes place between the gas streams and the chambers, so that each of the chambers is periodically traversed, at first, successively by all of the partial streams of the drying medium in order of increasing moisture contents, and subsequently, by the gaseous medium to regenerate the adsorbent. Following each switching, at least one of the chambers of each group is assigned to the next following group in the cycle.

33 Claims, 2 Drawing Figures

INSTALLATION FOR THE DEHUMIDIFICATION OF A GASEOUS DRYING MEDIUM USING AN ADSORBENT AND WITH REGENERATION OF THE ADSORBENT

The invention concerns an installation for the dehumidification of a gaseous drying medium using an adsorbent and with regeneration of the adsorbent, wherein the gaseous drying medium is divided into several partial streams with different humidity contents for use in the different phases of a drying process.

In DE-OS No. 1,729,438 a drying process for the production of rapidly dissolving products, such as instant coffee, milk powder, dried fruit or vegetable substances, is described, wherein there is employed a gaseous drying medium which has a relatively higher humidity content at the onset of the drying process than in the subsequent drying phase.

In BE Pat. No. 68 65 60, a process and an apparatus for the dehumidification of a stream of drying gas laden with humidity, are described, wherein two separate chambers filled with an adsorbent are used, each of which is traversed alternatingly by the stream of drying gas for its dehumidification and by a further stream of gas for the regeneration of the adsorbent.

In order to combine the two known processes with each other, as proposed in DE-OS No. 1,729,438, the moisture content of the stream of drying gas must be variable or capable of being maintained constant over an extended period of time, respectively. This may be accomplished, for example, by correspondingly controlling the time of passage of the stream through the respective chamber.

For the use on a major industrial scale of the process of DE-OS No. 1,729,438, it is appropriate to employ several drying installations which operate with a shift in phase in keeping with the above-cited published application. It is necessary in this case to have several streams of drying gas with different moisture contents available.

It is the object of the invention to provide an installation capable of simultaneously dehumidifying several partial streams of a stream of drying gas, with an economical usage of the adsorbent and of the energy required for the regeneration of the adsorbent.

The object of the invention is attained by providing plural chambers which are separate from each other and are subdivided into groups and which are filled with the adsorbent, wherein each of the several groups of chambers is traversed respectfully by a partial stream of the drying medium for its dehumidification, while a gaseous medium flows through a further group of chambers to regenerate the adsorbent located in said further group of chambers. Also there is continuous switching between the chambers and the gas streams so that each chamber is periodically traversed, at first, successively by all of the partial streams of the drying medium in the order of increasing moisture contents, and subsequently, by the gaseous medium for the regeneration of the adsorbent, while following each switching at least one chamber of each group is assigned to the next following group in the cycle.

The essential advantage of the installation according to the invention resides in the fact that it is possible not only to dehumidify any desired number of partial streams of the drying medium, each with a different moisture content, for use in different phases of a drying process, but that by means of the continuously changing composition of each group of chambers the partial streams can be dehumidified without interruption and the moisture content of each partial stream can be maintained substantially constant. Furthermore, the regeneration of the adsorbent loaded with moisture can be carried out continuously and with a constant and optimally adjustable energy input.

Preferably, the chambers are formed in a vertical cylinder by radial partition walls, and the cylinder is connected with a conduit system to conduct the streams of gas while being interconnected or switched by a valving apparatus. This results in the advantage that the switching between the individual chambers and the streams of gas can take place very rapidly and simultaneously.

In a preferred embodiment of the installation according to the invention, the cylinder is supported so as to be rotatable about its axis, so that by rotating the cylinder by the width of one chamber at a time, each chamber may be connected with another conduit of the conduit systems.

Alternatively, the cylinder may be connected with the conduit system by means of the insertion of a plurality of individual valves, which may be actuated so that each chamber is always connected with only one conduit of the conduit system.

In comparison to the embodiment wherein the cylinder is acting as a rotating slide, or with an embodiment wherein a rotating slide is provided between the cylinder and the conduit system, the embodiment wherein a plurality of valves is used for the cyclic connection of the chambers with the stream of gas has the advantage that it provides a plurality of connection possibilities, so that the moisture content, the temperature and other parameters of the partial drying streams can be adapted at all times rapidly and exactly to the requirements of the drying process. On the other hand, the embodiment containing the valves requires a slightly higher construction outlay.

The consumption of energy for the operation of the installation according to the invention is kept especially low when each partial stream of the drying medium is conducted in a closed primary circuit between the respective groups of chambers and a drying installation associated with it, and when the exhaust gases of a turbine are used for the regeneration of the adsorbent, said exhaust gases being circulated in an open secondary circuit with multiple utilization of their heat content.

Preferably, the chambers are followed in the secondary circuit by a plurality of regenerative heat exchangers, alternatingly absorbing heat from the hot exhaust gases and transferring it to a stream of gas which is conducted in a closed third circuit and is led into a chamber with the adsorbent to be regenerated.

An exemplary embodiment of the invention is illustrated in the drawings and is described in more detail hereinafter with reference to the drawings.

Figure 2:
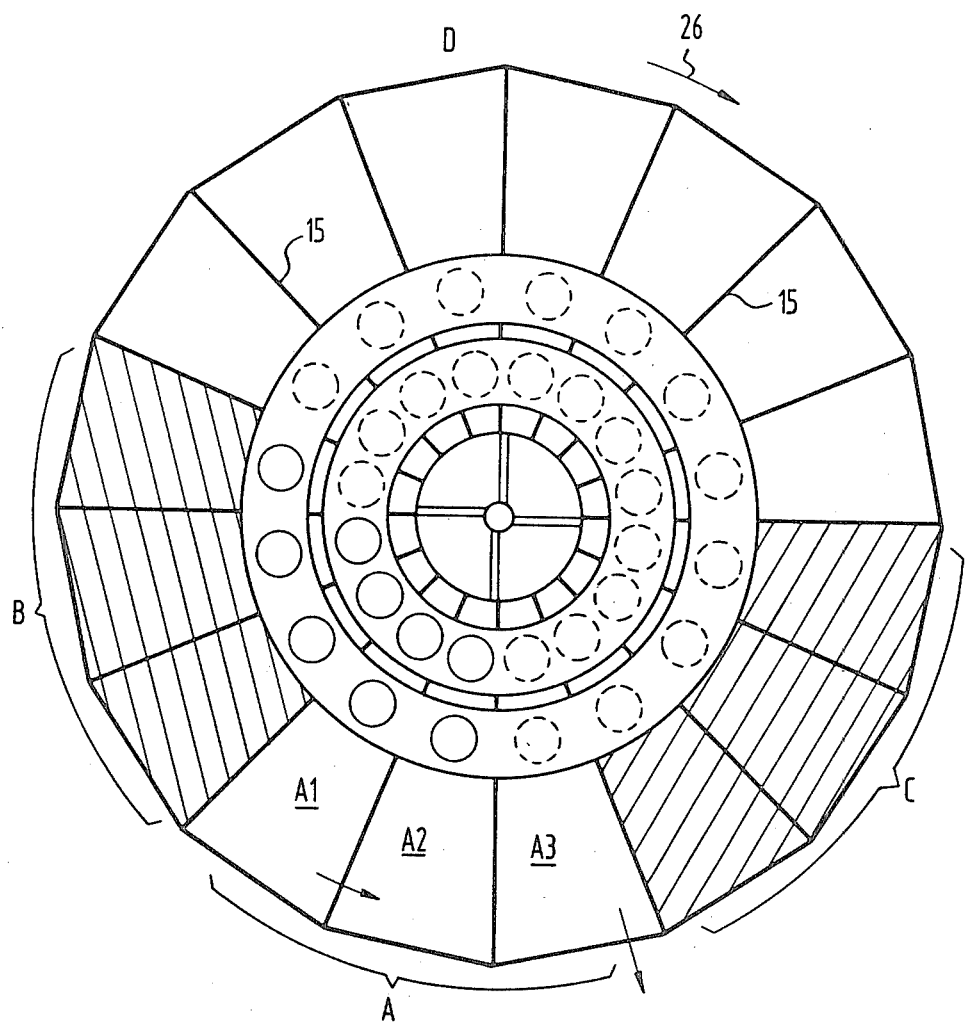

In the drawings:

FIG. 1 is a block diagram of a dehumidification and regenerating installation according to the invention; and FIG. 2 is a schematic cross section through a rotating adsorber used in the installation illustrated in FIG. 1.

The dehumidifying and regenerating installation shown in FIG. 1 is connected with three drying devices 1A, 1B, 1C, wherein three different phases of a spray drying process for the production of a rapidly dissolving product are being carried out. In the drying device 1A, the first phase of the spray drying process is taking place for the time being, whereby a partial stream of the drying medium is conducted through the drying device 1A in the direction of the arrow, in counter-current manner to the product being sprayed from above onto a conveyer 3. This partial stream has a relatively high moisture content in comparison with the subsequent drying phases. The partial stream of the drying gas flows in a closed primary circuit through a conduit system 7A, in which are connected a rotating adsorber 11 to dehumidify the partial stream, a blower 10A to propel the partial stream of the drying gas and a filter 9A, and which is inserted upstream of the drying apparatus 1A.

The second phase of the spray drying process is taking place for the time being in the drying apparatus 1B, wherein a further partial stream of the drying gas is conducted through the drying apparatus 1B in the direction of the arrow, co-currently with the product sprayed onto the conveyer 3. This partial drying stream is again conducted in a closed circuit within a conduit system 7B, in which is also connected a rotating adsorber 11 to dehumidify the partial drying stream, a blower 10B to propel said stream and a filter 9B.

In the drying apparatus 1C the third phase of the spray drying process is effected for the time being, with an extremely dry and cold partial stream of the drying gas passing through the drying apparatus 1C in the direction of the arrow, co-currently with the product sprayed onto the conveyer 3. This partial stream, for effecting the final drying, is also conducted in a closed circuit in a conduit system 7C through a rotating adsorber 11, a blower 10C and a filter 9C.

It is emphasized that the three drying phases are assigned in the manner described to the three drying devices 1A, 1B, 1C for the time being only, because a complete spray drying process is effected in each of the drying devices, but with a shift in phase with respect to the drying processes taking place in the two other drying installations. For this purpose, each of the conduit systems 7A, 7B, 7C can be connected with the rotating adsorber 11, whereby the drying gas required for each drying phase can be supplied to the corresponding drying installation with the proper moisture content and at the appropriate temperature. Each of the conduit systems 7A, 7B, 7C is designed and equipped with valves, not shown, so that the respective partial stream of the drying gas can be introduced selectively from the top or the bottom.

The rotating adsorber 11 has a hollow cylinder wherein sector shaped chambers (FIG. 2) are arranged, which are separated from each other by radial partition walls 15. The chambers are filled with silica gel as the adsorbent, through which the partial streams of the drying gas are passed to be dehumidified.

The rotating adsorber 11 is further connected with a conduit system 16, through which an inert gas is supplied for processing (desorption or regeneration) of the silica gel. By means of a switching or valving device, not shown in detail, it is possible to process the silica gel in part of the chambers and to dehumidify the drying medium in the other chambers by means of the silica gel.

In the illustrated embodiment, the adsorber 11 contains a total of 16 chambers. The gels in the three chambers A are being processed at the moment. The chambers B are connected in parallel with the primary circuit 7C, so that the drying gas leaving the chambers B passes into the dryer 1C, wherein the product to be dried is exposed to final drying in the third drying phase. The gel in the chambers B has been freshly processed immediately prior to the operating phase which is being considered for the moment. The chambers C are connected for the moment with the primary circuit 7A, so that the drying gas leaving them is conducted to the dryer 1A operating in the first drying phase, i.e., in counter-current manner. In the operating phase immediately preceding the phase under consideration at the moment, the chambers C belonged to the group D of the operating phase presently being considered, which are connected at the moment with the primary circuit 7B, so that the drying gas leaving them is passed to the dryer 1B, wherein the product to be dried is undergoing Phase 2, the principal drying process, in a co-current manner. All of the chambers of the groups B, C and D are traversed in a parallel operation by the partial streams of the drying gas.

The drying gas leaving the chambers of Group B arrives, as mentioned hereinabove, in the dryer 1C, wherein the final drying of the product to be dried is carried out. However, part of this stream of gas is branched off, to be conducted into the chamber A1 of group A, in order to there effect that final processing of the gel, i.e., the cooling of the dried gel, without wetting it. The actual drying of the gel (regeneration, desorption) takes place in chamber A2, into which the still hot and dry gas of the secondary circuit 16 is fed. In chamber A2 desorption takes place at a temperature of approximately 160° C. The inert gas leaving the chamber A1, which has the temperature resulting from the cooling of the gel in chamber A1 and which is dry, is mixed with the inert gas from the circuit 16 in chamber A2. In chamber A3, the preheating and predesorption of the gel is effected, by conducting the gas leaving chamber A2 into the chamber A3. The gas leaving the block of chambers A is now passed selectively into one of three regenerative heat exchangers 21, in which the remaining sensible heat, in particular the heat of condensation, is transferred to the heat exchanger, prior to the discharge of the gas into the atmosphere.

The secondary circuit is supplied by the exhaust gas of a turbine 22, which exhaust gas is purified in an exhaust purifier 23 and a filter 24 prior to its arrival in the adsorber 11. The turbine 22 also supplies the energy needed to operate the installation. A blower 25 serves to propel the air of combustion.

The heat transferred by the gas leaving the block of chambers A to the heat exchangers 21 is recycled to the adsorber by means of an inert gas flowing in a third circuit 20, which as a closed circuit selectively includes one of the heat exchangers and the adsorber. Leakage losses in this circuit 20 and likewise in the primary circuits 7A, 7B, 7C are taken from the gas of the circuit 16 escaping into the atmosphere. As mentioned hereinabove, the heat exchangers 21 are used with alternating functions. One heat exchanger respectively is always accepting heat from the gas of the circuit 16, in order to transfer it, after switching, to the gas of the circuit 20.

Part of the dehumidified drying gas coming from the adsorber 11 passes through one of the three heat exchangers, in order to cool it completely, so that it is again ready for condensation. The heat absorbed by the gas of the third circuit effects a rise in temperature, e.g., from 20° C. to 30° C.

Following a certain period of time, determined by parameters such as the moisture content and the temperature of the partial streams of the drying gas, the connection of the rotating adsorber to the conduit systems is altered by rotating the rotating adsorber in the direction of the arrow 26 by the width of one chamber, so that continuous drying with largely constant humidity and temperature values of the streams of the drying gas and the continuous uniform processing of the gel, are possible.

The appropriate mixing of the streams of gas in combination with the multiple utilization of the heat content of the processing medium results in the maximum utilization of energy in each individual case.

In summary, the installation according to the invention, in combination with the process effected by the drying installations, may be characterized as a multiple stage adsorption-dehydration process.

I claim:

1. A device for the dehumidification of a gaseous drying medium, which comprises (1) means for providing a stream of gaseous drying medium comprising a plurality of separate partial streams of differing moisture content and (2) common drying means for receiving all of said partial streams, said common drying means comprising
   (a) a plurality of chambers, each containing an amount of adsorbent material; and
   (b) means for successively providing to one or more chambers of said plurality of chambers a stream of adsorbent material-regenerating gaseous medium, such that each of said plurality of chambers first receives each of said partial streams in order of increasing moisture content and thereafter receives said stream of adsorbent material-regenerating gaseous medium.

2. A device as in claim 10, wherein said common drying means comprises a cylinder at least a portion of which is divided into a plurality of chambers by partitioning walls oriented radially relative to the central axis of said cylinder, and wherein each of said partial streams is provided to said common drying means through first valve means by a separate conduit comprising a primary circuit, there being at least as many separate conduits as there are partial streams.

3. A device as in claim 11, wherein said cylinder is rotatable around said central axis such that rotation of said cylinder through a distance equal to the width of one of said chambers changes the connection of each of said chambers from one to another of said separate conduits.

4. A device as in claim 2, wherein said first valve means are actuatable such that each of said chambers is always connected to only one of said separate conduits.

5. A device as in claim 1, wherein said plurality of chambers comprises at least one group comprising at least two of said plurality of chambers, the chambers comprising said group being serially interconnected by second valve means for controlling flow of gases between said chambers of said group.

6. A device as in claim 1, wherein said adsorbent material-regenerating gaseous medium comprises the exhaust of a turbine, and wherein said means (b) comprises a conduit comprising an open secondary circuit which includes said common drying means and said turbine, such that said exhaust passes to said common drying means from said turbine through said conduit.

7. A device as in claim 6, wherein means (b) further comprises a plurality of heat exchangers, at least one first heat exchanger of said plurality of heat exchangers being capable of receiving a stream of heated gas conveyed from said common drying means by said open secondary circuit.

8. A device as in claim 7, wherein at least one second heat exchanger of said plurality of heat exchangers is connectable to said common drying means by a conduit comprising a closed tertiary circuit, said second heat exchanger being in heat-exchanging contact with said first heat exchanger.

9. A device as in claim 8, wherein at least one third heat exchanger of said plurality of heat exchangers is capable of receiving a predetermined portion of at least one partial stream of said plurality of partial streams after said partial stream has passed through said common drying means, said third heat exchanger being in heat-exchanging contact with said second heat exchanger.

10. A device as in claim 9, further comprising means for designating in a predetermined order any of said plurality of heat exchangers as said first, second, and third heat exchangers, respectively.

11. Drying apparatus comprising
   (1) a first plurality of separate chambers, each suitable for containing an amount of moist material;
   (2) means for providing a gaseous drying medium which comprises a plurality of separate partial streams of differing moisture content;
   (3) common drying means for receiving all of said partial streams, comprising
      (a) a second plurality of chambers, each containing an amount of adsorbent material, and
      (b) means for successively providing to one or more chambers of said second plurality of chambers a stream of adsorbent material-regenerating gaseous medium, such that each of said plurality of chambers first receives each of said partial streams in order of increasing moisture content and thereafter receives said stream of adsorbent material-regenerating gaseous medium;
   (4) means for successively providing each of said partial streams in order of increasing moisture content from said common drying means to two or more chambers of said first plurality of chambers in a predetermined order of said first plurality of chambers; and
   1(5) means for initiating said predetermined order at any selected chamber among said first plurality of chambers.

12. Drying apparatus as in claim 11, wherein said common drying means comprises a cylinder at least a portion of which is divided into a second plurality of chambers by partitioning walls oriented radially relative to the central axis of said cylinder, and wherein each of said partial steams is provided to said common drying means through first valve means by a separate conduit comprising a closed primary circuit, there being at least as many separate conduits as there are partial streams.

13. Drying apparatus as in claim 12, wherein said cylinder is rotatable around said/central axis such that rotation of said cylinder through a distance equal to the width of one of said second plurality of chambers changes the connection of each of said chambers from one to another of said separate conduits.

14. Drying apparatus as in claim 12, wherein said first valve means are actuatable such that each of said of chambers is always connected to only one of said separate conduits.

15. Drying apparatus as in claim 11, wherein said second plurality of chambers comprises at least one group comprising at least two of said second plurality of chambers, the chambers comprising said group being serially interconnected by second valve means for controlling flow of gases between said chambers of said group.

16. Drying apparatus as in claim 11, wherein said adsorbent material-regenerating gaseous medium comprises the exhaust of a turbine, and wherein said means (b) comprises a conduit comprising an open secondary circuit which includes said common drying means and said turbine, such that said exhaust passes to said common drying means from said turbine through said conduit.

17. Drying apparatus as in claim 16, wherein means (b) further comprises a plurality of heat exchangers, at least one first heat exchanger of said plurality of heat exchangers being capable of receiving a stream of heated gas conveyed from said common drying means by said open secondary circuit.

18. Drying apparatus as in claim 17, wherein at least one second heat exchanger of said plurality of heat exchangers is connectable to said common drying means by a conduit comprising a closed tertiary circuit, said second heat exchanger being in heat-exchanging contact with said first heat exchanger.

19. Drying apparatus as in claim 17, wherein at least one third heat exchanger of said plurality of heat exchangers is capable of receiving a predetermined portion of at least one partial stream of said plurality of partial streams after said partial stream has passed through said common drying means, said third heat exchanger being in heat-exchanging contact with said second heat exchanger.

20. Drying apparatus as in claim 19, further comprising means for designating in a predetermined order any of said plurality of heat exchangers as said first, second, and third heat exchangers, respectively.

21. A drying process comprising the steps of
(1) providing a stream of gaseous drying medium comprising a plurality of separate partial streams of differing moisture content;
(2) successively providing each of said partial streams in order of increasing moisture content to each of a first plurality of separate chambers in a predetermined order of said chambers, at least two of said first plurality of chambers each containing an amount of moist material; and
(3) repeating step (2) at least once, such that during each repeating step, the first of said first plurality of chambers to have been provided with said partial streams during the immediately preceding step is last in said predetermined order of said first plurality of chambers and each of the remaining of said first plurality of chamber is advanced one chamber in said predetermined order.

22. A drying process as in claim 21, wherein said first chamber of said first plurality of chambers receiving said partial streams contains an amount of moist material which had a higher moisture content when the first of said partial stream was received than did the moist material in the remaining of said first plurality of separate chambers in said predetermined order.

23. A drying process as in claim 21, further comprising a step of passing each of said separate partial streams through common drying means comprising a second plurality of separate chambers, each containing an amount of adsorbent material, such that each of said second plurality of chambers receives in a predetermined order of said second plurality of chambers
(i) each of said partial streams in order of increasing moisture content, each of said partial streams being conveyed by separate conduits comprising a primary circuit, there being at least as many separate conduits as there are partial streams; and thereafter
(ii) a stream of adsorbent material-regenerating gaseous medium.

24. A drying process as in claim 23, wherein said step of passing each of said separate partial streams through said common drying means is repeated at least once, such that during each repeating step, the first of said second plurality of chambers to have been provided with said partial streams during the immediately preceding step is last in said predetermined order of said second plurality of chambers and each of the remaining of said second plurality of chambers is advanced one chamber in said predetermined order.

25. A drying process as in claim 23, wherein said stream of adsorbent material-regenerating gaseous medium is conveyed by an open secondary circuit through each chamber of at least one predesignated group of said second plurality of chambers comprising said common drying means, the chambers which comprise said predesignated group being serially interconnected to permit controllable flow of gases between said chambers of said group.

26. A drying process as in claim 25, wherein said stream of adsorbent material-regenerating gaseous medium passes from said predesignated group of chambers by said open secondary circuit through at least one first heat exchanger of a plurality of heat exchangers, said first heat exchanger being in heat-exchanging contact with at least one second heat exchanger of said plurality of heat exchangers.

27. A drying process as in claim 26, wherein an inert gas passes through said second heat exchanger by a conduit comprising a closed tertiary circuit which includes said common drying means, whereby heat from said open secondary circuit is transferred to said closed tertiary circuit through said heat-exchanging contact between said first and second heat exchangers.

28. A drying process as in claim 27, wherein a predetermined portion of at least one partial stream of said plurality of partial streams is conveyed to at least one third heat exchanger of said plurality of heat exchangers after said partial steam has passed through said common drying means, said third heat exchanger being in heat-exchanging contact with said second heat exchanger such that heat from said partial stream is transferred to said closed tertiary circuit.

29. A drying process as in claim 28, wherein said inert gas in said closed tertiary circuit passes through a predetermined chamber of said predesignated group of chambers when adsorbent material in said chamber is undergoing regeneration, whereby heat is transferred to said adsorbent material from said inert gas.

30. A drying process as in claim 28, wherein each of said plurality of heat exchangers, in a predetermined order is designated said first heat exchanger and is thereafter designated said second heat exchanger, such that each of said plurality of heat exchangers is connected first into said open secondary circuit and thereafter into said closed tertiary circuit.

31. A drying process as in claim 29, wherein the sum of (a) heat lost from said primary circuit and (b) heat lost from said closed tertiary circuit is substantially equal to heat imparted by said open second circuit.

32. A drying process as in claim 25, wherein adsorbent material in at least one chamber of a first predesignated group of said second plurality of chambers undergoes regeneration at a predetermined time after adsorbent material in at least one chamber of a second predesignated group of said second plurality of chambers has undergone regeneration.

33. A drying process as in claim 32, wherein a predetermined portion of a partial stream of said plurality of partial streams is conveyed from said second predetermined group to said chamber of said first predetermined group at a predetermined time after said adsorbent material-regenerating gaseous medium has passed through said chamber of said first predetermined group.

* * * * *